(12) United States Patent
Takagi

(10) Patent No.: US 7,350,391 B2
(45) Date of Patent: Apr. 1, 2008

(54) METHOD FOR MANUFACTURING CLUTCH HOUSING

(75) Inventor: Masayuki Takagi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 21 days.

(21) Appl. No.: 10/772,236

(22) Filed: Feb. 6, 2004

(65) Prior Publication Data

US 2004/0250593 A1    Dec. 16, 2004

(30) Foreign Application Priority Data

Feb. 7, 2003    (JP) .............................. 2003-031021

(51) Int. Cl.
*B21D 22/00* (2006.01)
*B21K 1/30* (2006.01)

(52) U.S. Cl. ............................ 72/356; 72/340; 72/348; 72/379.2; 29/893.34

(58) Field of Classification Search .. 29/893.3–893.37, 29/893.24, 892.3; 72/340, 125.5, 348, 334, 72/102, 108, 356, 602 R, 379.2, 341, 335, 72/379.4, 339; 82/905; 192/3.51, 115, 12 D, 192/110 S See application file for complete search history.

(56) References Cited

U.S. PATENT DOCUMENTS

| | | | | |
|---|---|---|---|---|
| 4,320,824 A | * | 3/1982 | Takahashi et al. | ........... 192/115 |
| 4,669,295 A | * | 6/1987 | Koitabashi | .................... 72/340 |
| 4,724,745 A | * | 2/1988 | Sumiya et al. | ................. 92/107 |
| 5,384,949 A | * | 1/1995 | Wodrich et al. | ............... 29/557 |
| 5,447,048 A | * | 9/1995 | Tanaka et al. | ................. 72/315 |
| 5,706,694 A | * | 1/1998 | Bhookmohan et al. | ........ 72/325 |
| 5,761,949 A | * | 6/1998 | Dalessandro et al. | .......... 72/325 |
| 5,987,728 A | * | 11/1999 | Townsend et al. | ............. 29/557 |
| 6,351,886 B1 | * | 3/2002 | Hasegawa | ................. 29/893.32 |
| 6,769,522 B2 | * | 8/2004 | Kawamoto et al. | ......... 192/3.29 |
| 7,024,751 B2 | * | 4/2006 | Sefcik et al. | ................... 29/558 |

FOREIGN PATENT DOCUMENTS

JP    3-189044 A    8/1991

* cited by examiner

*Primary Examiner*—Dmitry Suhol
(74) *Attorney, Agent, or Firm*—Miles & Stockbridge P.C.

(57) ABSTRACT

A method for manufacturing a clutch housing comprises: a first step of forming a work into a pre-product having a shaft portion and an outer drum portion enclosing the shaft portion integrally with the shaft portion; a second step of subjecting the pre-product to predetermined processing; and a third step of providing a spline on an inner periphery of the outer drum portion by flow forming, and forming the clutch housing into an almost completed product, wherein in the first step, an outer peripheral cylindrical portion of the outer drum portion is formed while being offset in an axial direction with respect to the shaft portion so that it is not opposite to at least part of the shaft portion in a radial direction.

22 Claims, 3 Drawing Sheets

METHOD FOR MANUFACTURING CLUTCH HOUSING

BACKGROUND OF THE INVENTION

1. Field of the Invention

The present invention relates to a method for manufacturing a clutch housing used for an automatic transmission of a vehicle or the like.

2. Description of the Related Art

A drum-type clutch housing is generally used for an automatic transmission (AT) of an automobile or the like. Such a clutch housing is manufactured to have predetermined accuracy and dimensions with a cold forging technique.

The clutch housing usually comprises a central shaft portion and an outer drum portion coupled thereto. The shaft portion and the outer drum portion are firmly coupled by welding, fastening and the like.

Such a manufacturing method is also known wherein the clutch housing is previously hot-forged into a product shape, and then predetermined accuracy is secured through cold forging, as disclosed in Japanese Patent Application Laid-open No. 3-189044 ("Patent document 1"), for example. In this example, the shaft portion and the outer drum portion are integrally formed.

The clutch housing described above has the following problems.

In the conventional clutch housing, the outer drum portion with a spline provided on its inner periphery and the shaft portion are processed from separate members, and then integrally jointed by welding, fastening or the like. This makes it easy to form oil holes and notches in the shaft portion, but at the same time poses problems of decreased strength and accuracy of a joint portion.

In order to solve the problems in manufacturing by coupling separate members, it is necessary to form integrally by forging as described in Patent document 1, for example. Such integral forming allows improvement in strength and accuracy as compared with a method in which the outer drum portion and the shaft portion are configured from the separate members and coupled, but leaves a problem that it is difficult to form the oil holes and notches in desired shapes in the shaft portion.

Since the outer drum portion obstructs entry of a drilling tool or the like into the shaft portion, the oil hole to be pierced in the shaft portion can not be pierced vertically to a shaft center and is thus pierced obliquely. When it is obliquely pierced, a boring machine such as a drill cannot be precisely positioned at the shaft portion, resulting in another problem that the oil hole cannot be pierced exactly at a predetermined position. A similar problem also occurs in a process of forming a notch such as a groove provided in the shaft portion.

SUMMARY OF THE INVENTION

It is therefore an object of the present invention to provide a method for manufacturing a clutch housing that can be mass-produced, and makes it possible not only to easily process oil holes and notches without being influenced by a shape of an outer drum portion, but also to improve strength and accuracy by use of an integrally formed material.

In order to attain the above object, the method for manufacturing a clutch housing according to a preferred embodiment of the present invention comprises:

a first step of forming a work into a pre-product having a shaft portion and an outer drum portion enclosing the shaft portion integrally with the shaft portion;

a second step of subjecting the pre-product to predetermined processing; and a third step of providing a spline on an inner periphery of the outer drum portion by flow forming, and forming the clutch housing into an almost completed product, wherein in the first step, an outer peripheral cylindrical portion of the outer drum portion is formed while being offset in an axial direction with respect to the shaft portion so that it is not opposite to at least part of the shaft portion in a radial direction.

In the present invention, in the first step, the outer peripheral cylindrical portion of the outer drum portion is formed while being offset in an axial direction with respect to the shaft portion so that it is not opposite to at least part of the shaft portion in a radial direction, and it is therefore possible to easily process the oil holes and notches without being influenced by the shape of the outer drum portion.

Furthermore, the present invention has the first step of forming the work into the pre-product having the shaft portion and the outer drum portion enclosing the shaft portion integrally with the shaft portion by hot forging, thereby allowing improvement in strength and accuracy by use of the integrally formed material.

The features described above enable the manufacture of the clutch housing that can be mass-produced.

DETAILED DESCRIPTION OF THE EMBODIMENT

Figure 1A:
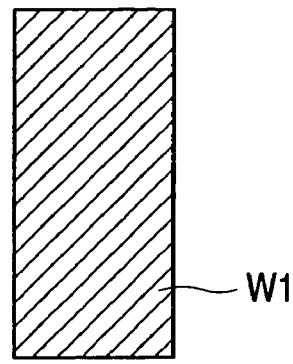
FIGS. 1A, 1B, 1C and 1D are sectional views showing one embodiment of a method for manufacturing a clutch housing according to the present invention, and show a procedure for forming a pre-product from a work by hot forging.
Figure 1A:

Embodiments of the present invention will hereinafter be described in detail in reference to the accompanying drawings. It should be noted that same parts are indicated by same numerals in the drawings. It is needles to mention that the embodiments described below are given as illustrations of the present invention rather than limitations.

FIGS. 1A to 1D are sectional views showing a first step of one embodiment of a method for manufacturing a clutch drum, that is, clutch housing according to the present invention. More particularly, these figures show a procedure for forming a pre-product from a work by hot forging. First, as shown in FIGS. 1A to 1D, a bar-shaped work (material) W1, which is a material suitable for the clutch housing, is prepared with a predetermined size so as to have a shape and capacity required for the clutch housing to be manufactured.

Figure 1B:
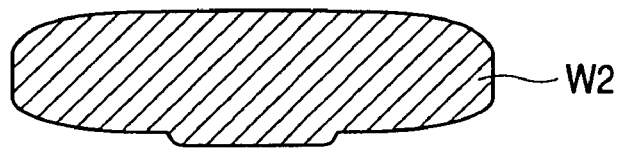
Figure 1B:
Figure 1C:
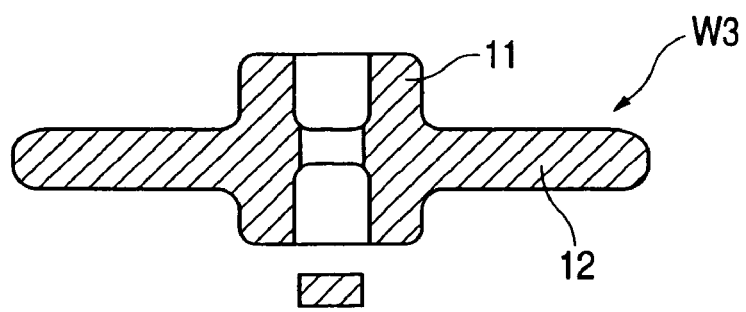
Figure 1C:

Next, this work W1 is heated to a temperature suitable for plastic forming, and formed into a shape shown in FIG. 1B through plastic forming by hot forging, thereby producing a work W2. Subsequently, the work W2 heated to a predetermined temperature is put into a forging mold where it is formed into a rough shape of a product by hot forging, thereby obtaining a work W3 having a shaft portion 11 with a through-hole penetrating in an axial direction and a substantially circular outer drum portion 12 extending in an outline direction from the shaft portion 11.

Finally, a clutch housing 1 as a pre-product is formed by a finisher, which comprises the shaft portion 11 having a through-hole 16 penetrating in an axial direction in the center, and the outer drum portion 12 integral with the shaft portion 11. In a first step shown in FIGS. 1A to 1D, an outer peripheral cylindrical portion 14 of an outer peripheral disk portion 13 is formed while being offset in an axial direction with respect to the shaft portion 11 so that it is not opposite to at least part of the shaft portion in a radial direction. An offset amount D is set to a predetermined value depending upon the size and the like of the clutch housing 1.

As described above, the offset forming produces a free space around a radial periphery of a region 15 of the shaft portion 11 where approach of tools such as a lathe is not interrupted, thus significantly facilitating processing conducted in a second step described later. The first step shown in FIGS. 1A to 1D is preferably implemented by hot forging, but can also be implemented by warm forging or cold forging. In addition, the outer peripheral disk portion 13 and the outer peripheral cylindrical portion 14 constitute the outer drum portion.

Figure 2A:
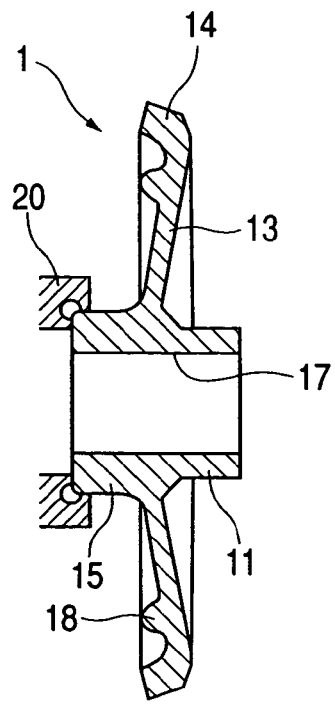
FIGS. 2A, 2B and 2C are explanatory views showing how the preformed work is subjected to predetermined processing such as oil hole piercing and notching.
Figure 2B:
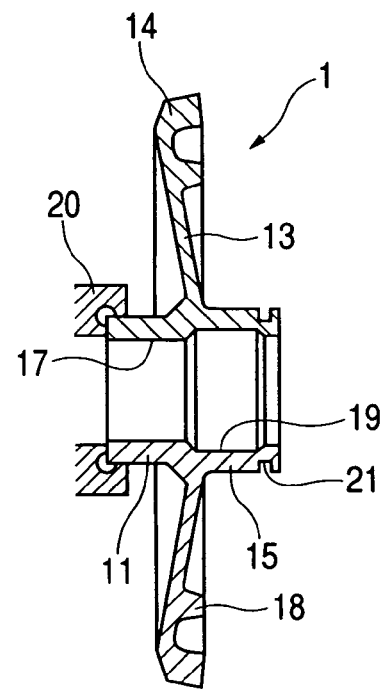
Figure 2C:
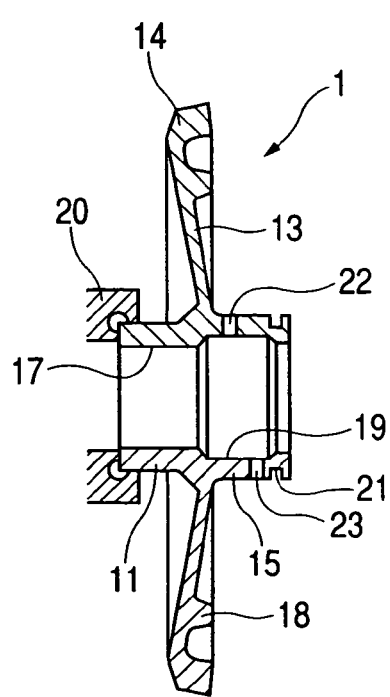
Figure 3:
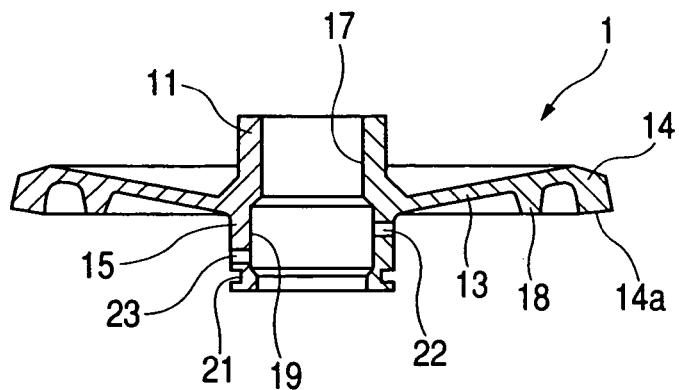
FIG. 3 is an axial sectional view of the clutch housing in which the processing in FIGS. 2A to 2C is completed.

The first step is followed by the second step shown in FIGS. 2A to 2C. Machine work is mainly performed in the second step. FIGS. 2A to 2C are axial sectional views showing how the preformed clutch housing 1 is subjected to predetermined processing such as oil hole piercing and notching, and FIG. 3 is an axial sectional view of the clutch housing 1 in which the processing of FIGS. 2A to 2C is completed.

Figure 1D:
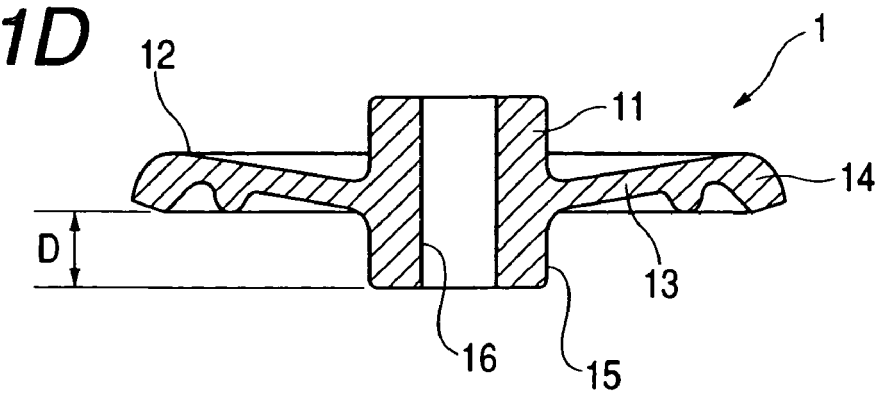

In the step of FIG. 2A, the clutch housing 1 is fixed and held by a chuck 20, and the through-hole 16 of the shaft portion 11 in a state of FIG. 1D is ground by the lathe or the like, thus increasing an internal diameter of the through-hole to obtain a through-hole 17. Before this, a surface on inner and outer peripheries of the shaft portion 11 and a surface of the outer drum portion 12 are ground to pare off outer layers.

Next, in FIG. 2B, to process the region 15 of the shaft portion 11 of the clutch housing 1, the chuck 20 grips a side of the shaft portion 11 opposite to that in FIG. 2A. Here, the through-hole 17 on the side of the region 15 is ground to form a cylindrical through-hole 19 having a larger diameter than the through-hole 17. A bearing (not shown) for supporting a shaft (not shown) to be fitted into the shaft portion 11 of the clutch housing 1 is disposed in the through-hole 19. In FIG. 2B, a circumferential groove 21 into which a stopper ring (not shown) is fitted is further formed on an outer peripheral surface of the region 15 of the shaft portion 11.

Two kinds of oil holes 22 and 23 penetrating in the radial direction to the through-hole 19 are formed by a drill or the like in the region 15 of the shaft portion 11 in FIG. 2C. The oil hole 22 is provided at a position close to a root of the outer peripheral disk portion 13 joining to the shaft portion 11, and the oil hole 23 is provided between the oil hole 22 and the circumferential groove 21 in the axial direction. Each of the oil holes 22 and 23 is provided substantially perpendicularly to a shaft center of the shaft portion 11. This makes it easier for oil to enter and exit through the oil holes 22 and 23 than through conventional oil holes which are obliquely pierced. It also facilitates processing, and makes it easier to place a tool of the drill, thus allowing drilling at an exact position. A plurality of the two kinds of oil holes 22 and 23 is provided in a peripheral direction. Spaces between the respective oil holes are preferably equal in a circumferential direction.

At any of stages in FIGS. 2A to 2C, a notch such as a key groove can further be provided by milling or the like on the outer periphery of the shaft portion 11. In addition, cold work is utilized for the grinding work and the like implemented in FIGS. 2A to 2C.

Figure 5:
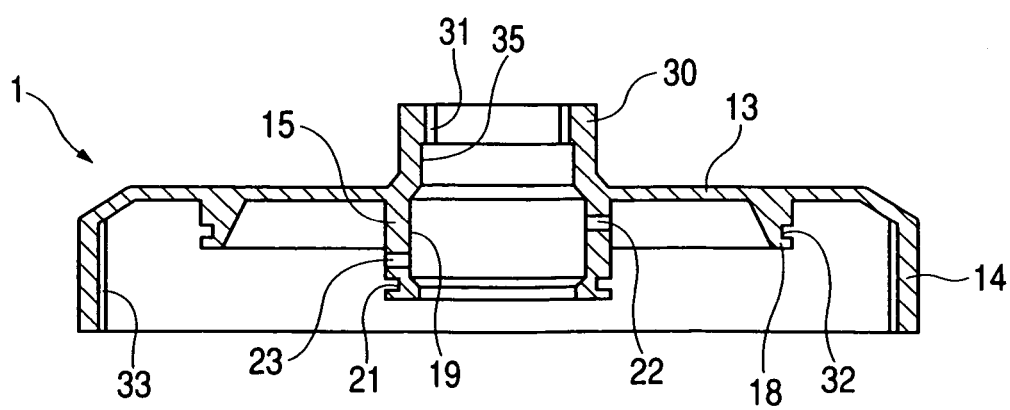
FIG. 5 is an axial sectional view showing the clutch housing which has been finished and become a completed product after the third step.

FIG. 3 is an axial sectional view showing the clutch housing 1 in which the processing of the clutch housing 1, in particular, the processing of the periphery of the shaft portion 11 is completed in the second step. As also shown in FIGS. 1A to 1D and FIGS. 2A to 2C, a projection 18 is provided on an inner side of the outer peripheral disk portion 13 between the shaft portion 11 and the outer peripheral cylindrical portion 14. This projection 18 is formed into a shape as shown in FIG. 5 described later, and engaged with one end of a clutch piston (not shown).

As apparent from FIG. 3, the outer peripheral disk portion 13 is offset with respect to the shaft portion 11 so that a free end 14a of the outer peripheral cylindrical portion 14 and an end of the projection 18 are in the same plane. This plane is configured substantially perpendicularly to the shaft portion 11, but can be further offset to define an obtuse angle, if necessary.

Figure 4:
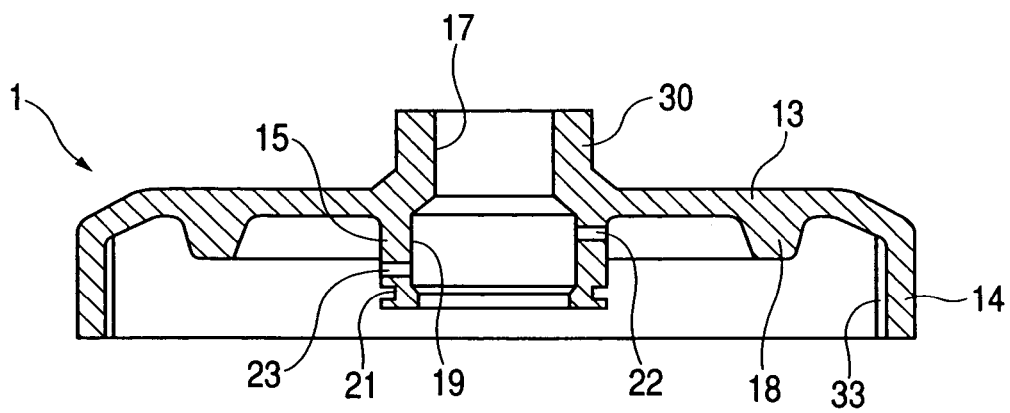
FIG. 4 is an axial sectional view showing the clutch housing formed into an almost completed product in which a spline is provided on an inner periphery of an outer drum by flow forming in a third step.

FIG. 4 shows a third step, and is an axial sectional view showing the clutch housing 1 of FIG. 3 which is formed, by a flow forming method, into an almost completed product in which a spline 33 is provided on an inner periphery of the outer drum. After flow-forming the clutch housing 1, the outer peripheral disk portion 13 is in a relationship substantially perpendicular to the shaft portion 11, and the outer peripheral cylindrical portion 14 is in a state spaced from the shaft portion 11 substantially in parallel therewith. A separator plate of a friction engagement device (not shown) disposed in the clutch housing 1 engages with the spline 33.

Use of the flow forming, which is a kind of plastic forming method, will provide a number of benefits. For example, the spline can be formed initially as an integral piece at lower cost, and a spline portion is cold-formed, thus increasing strength, and further, an integral configuration does not cause strain due to welding, thus securing accuracy.

FIG. 5 is an axial sectional view showing the clutch housing 1 which has been finished and become a completed product after the third step. Here, the entire product is finished by grinding or the like. Therefore, it is generally thinner than the one shown in FIG. 4. In a finishing step of FIG. 5, a spline 31 is formed on an inner peripheral surface of the shaft portion 11 on the side opposite to the region 15. A drive shaft (not shown) comprising a corresponding spline on its outer periphery is fitted into the spline 31, and the clutch housing 1 is supported so as to rotate integrally with the drive shaft. In the shaft portion 11, between the through-hole 19 and the through-hole 17, a third through-hole 35 having a diameter sized between those of both the through-holes is formed by grinding.

In the finishing step, the projection 18 is further processed, and a circumferential groove 32 into which an O-ring is fitted is formed. The oil holes 22 and 23 provided in the shaft portion 11 of the clutch housing 1 which has become the completed product will here be described. The oil hole 22 is provided to operate the clutch piston (not shown) provided adjacent to the outer peripheral disk portion 13, and to supply a hydraulic pressure to a hydraulic chamber (not shown) defined between the oil hole 22 and the outer peripheral disk portion 13.

Furthermore, a canceller (not shown) for cancelling the pressing of the clutch piston is provided on an axial outer side of the clutch piston, and the oil hole 23 is provided to supply a hydraulic pressure to a hydraulic chamber defined between the clutch piston and the canceller.

In the above description, the clutch housing shown in FIGS. 1A to 1D to FIG. 3 and the clutch housing shown in FIG. 4 and FIG. 5 have different sizes, but it is slightly enlarged for convenience of description to show details in FIG. 4 and FIG. 5, and they do not show the actual size of the product. The clutch housing formed by the manufacturing method of the present invention can be used for an automatic transmission, and a multiple disk friction engagement device incorporated inside may be either a wet type or dry type.

The following effects can be obtained according to the method for manufacturing the clutch housing of the present invention described above. It is possible not only to easily process the oil holes and notches without being influenced by the shape of the outer drum portion, but also to improve strength and accuracy by use of an integrally formed material, thereby allowing the mass production of the clutch housing.

What is claimed is:

1. A method for manufacturing a clutch housing, comprising:
    a first step of forming a work into a pre-product having a shaft portion and an outer drum portion enclosing the shaft portion integrally with the shaft portion;
    a second step of working the pre-product, including forming a hole in said shaft portion, said hole extending substantially perpendicular to an axial direction of said shaft portion; and
    a third step of providing a spline on an inner periphery of the outer drum portion by flow forming, and forming the pre-product into an almost completed product,
    wherein in the first step, an outer peripheral cylindrical portion of the outer drum portion is formed while being offset in an axial direction with respect to the shaft portion so that it is not opposite, in a radial direction, to a region where said hole is to be formed in the second step, and
    wherein in the third step, said outer peripheral cylindrical portion of the outer drum portion is further formed so that a part of said outer peripheral cylindrical portion is radially opposite said region where said hole is formed.

2. The method for manufacturing a clutch housing according to claim 1, wherein the working of the second step comprises forming a plurality of said holes in the shaft portion, and forming a groove on an outer periphery of the shaft portion.

3. The method for manufacturing a clutch housing according to claim 2, wherein a step of surface finishing is conducted after the third step.

4. The method for manufacturing a clutch housing according to claim 3, wherein the step of surface finishing includes grinding.

5. The method for manufacturing a clutch housing according to claim 1, wherein a step of surface finishing is conducted after the third step.

6. The method for manufacturing a clutch housing according to claim 5, wherein the step of surface finishing includes grinding.

7. The method for manufacturing a clutch housing according to claim 1, wherein the first step is conducted by hot forging, and the third step is conducted by cold forging.

8. A method for manufacturing a clutch housing, comprising the steps of:
    (a) forming a work into a pre-product having a shaft portion and an outer drum portion integral with the shaft portion, the outer drum portion having an outer peripheral cylindrical portion joined to the shaft portion through a disk portion which is oblique with respect to an axis of the shaft portion such that the outer peripheral cylindrical portion is offset in an axial direction with respect to the shaft portion so that it is not opposite to at least part of the shaft portion in a radial direction;
    (b) working said part of the shaft portion; and
    (c) subsequent to step (b), subjecting the pre-product to flow forming so as to form the pre-product into a substantially completed clutch housing having a spline on an inner periphery of the outer peripheral cylindrical portion,
    wherein step (c) includes further forming of said outer peripheral cylindrical portion so that a part of said outer peripheral cylindrical portion is radially opposite said part of the shaft portion.

9. The method for manufacturing a clutch housing according to claim 8, wherein step (b) includes forming oil holes in said part of the shaft portion.

10. The method for manufacturing a clutch housing according to claim 9, wherein the oil holes are substantially perpendicular to an axis of the shaft portion.

11. The method for manufacturing a clutch housing according to claim 9, wherein step (b) further includes forming a groove on an outer periphery of said part of the shaft portion.

12. The method for manufacturing a clutch housing according to claim 8, further comprising a step of surface finishing the substantially completed clutch housing.

13. The method for manufacturing a clutch housing according to claim 12, wherein the step of surface finishing includes grinding.

14. The method for manufacturing a clutch housing according to claim 8, wherein step (a) includes hot forging, and step (c) includes cold forging.

15. The method for manufacturing a clutch housing according to claim 8, wherein step (c) is conducted such that the disk portion becomes substantially perpendicular to the axis of the shaft portion and the outer peripheral cylindrical portion becomes substantially parallel to the axis of the shaft portion.

16. A method for manufacturing a clutch housing, comprising the steps of:
    (a) forming a work into a pre-product having a shaft portion and an outer drum portion integral with the shaft portion, the outer drum portion having an outer peripheral cylindrical portion joined to the shaft portion through a disk portion which is oblique to an axis of the shaft portion such that the outer peripheral cylindrical portion is offset in an axial direction with respect to the shaft portion so that it is not opposite to at least part of the shaft portion in a radial direction;
    (b) working said part of the shaft portion; and
    (c) subsequent to step (b), forming the pre-product into a substantially completed clutch housing having a spline on an inner periphery of the outer peripheral cylindrical portion, wherein step (c) includes further forming of said outer peripheral cylindrical portion so that a part of said outer peripheral cylindrical portion is radially opposite said part of the shaft portion.

17. The method for manufacturing a clutch housing according to claim 16, wherein step (b) includes forming oil holes in said part of the shaft portion.

18. The method for manufacturing a clutch housing according to claim 17, wherein the oil holes are substantially perpendicular to an axis of the shaft portion.

19. The method for manufacturing a clutch housing according to claim 17, wherein step (a) includes hot forging, and step (c) includes cold forging.

20. The method for manufacturing a clutch housing according to claim 17, wherein step (c) is conducted such that the disk portion becomes substantially perpendicular to the axis of the shaft portion and the outer peripheral cylindrical portion becomes substantially parallel to the axis of the shaft portion.

21. The method for manufacturing a clutch housing according to claim 16, wherein step (a) includes hot forging, and step (c) includes cold forging.

22. The method for manufacturing a clutch housing according to claim 16, wherein step (c) is conducted such that the disk portion becomes substantially perpendicular to the axis of the shaft portion and the outer peripheral cylindrical portion becomes substantially parallel to the axis of the shaft portion.

* * * * *